Oct. 12, 1971 P. P. PARRIS 3,611,548
PANEL CONSTRUCTION AND METHOD
Original Filed April 12, 1967
4 Sheets-Sheet 1
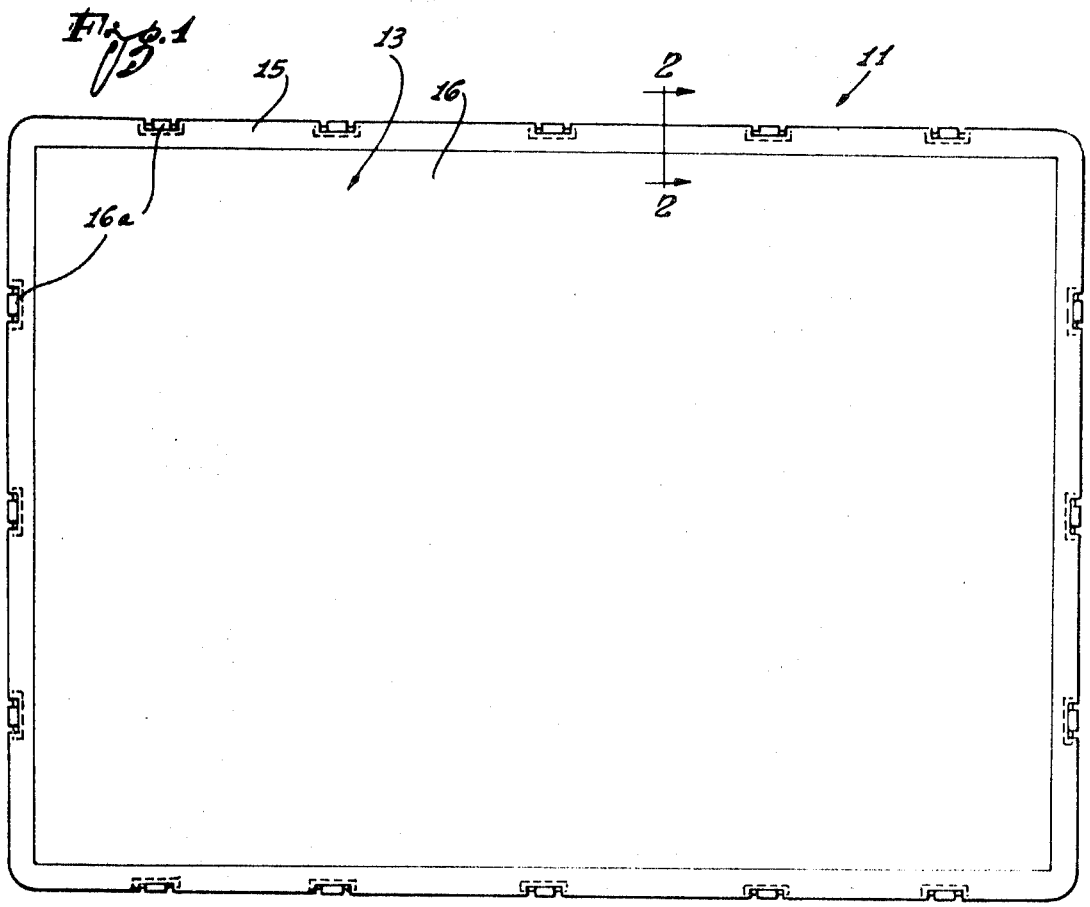
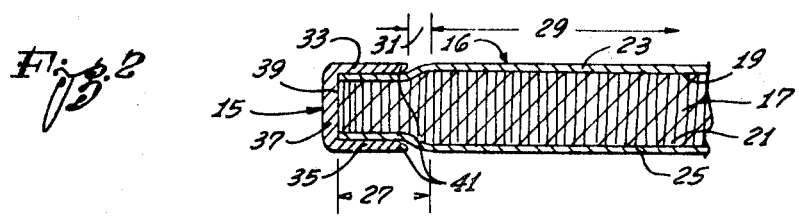
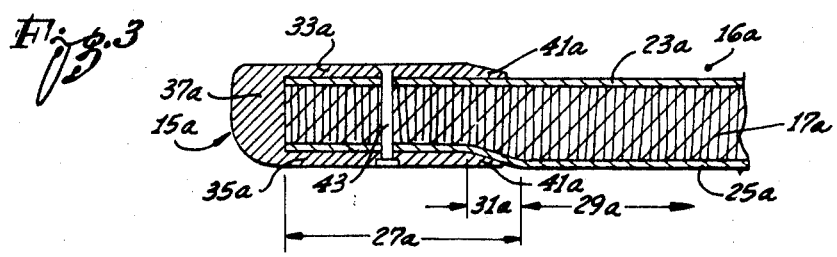
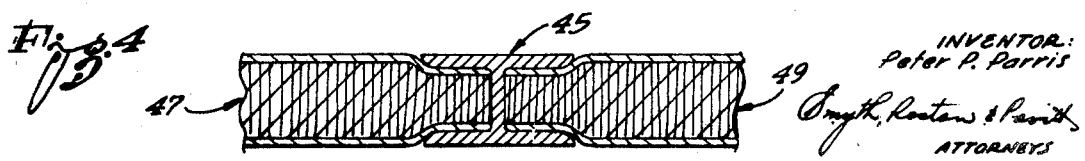
INVENTOR:
Peter P. Parris
Smyth, Roston & Pavitt
ATTORNEYS

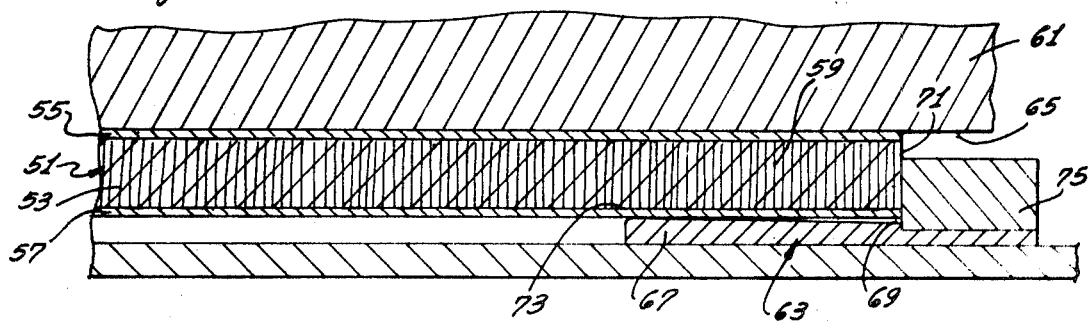
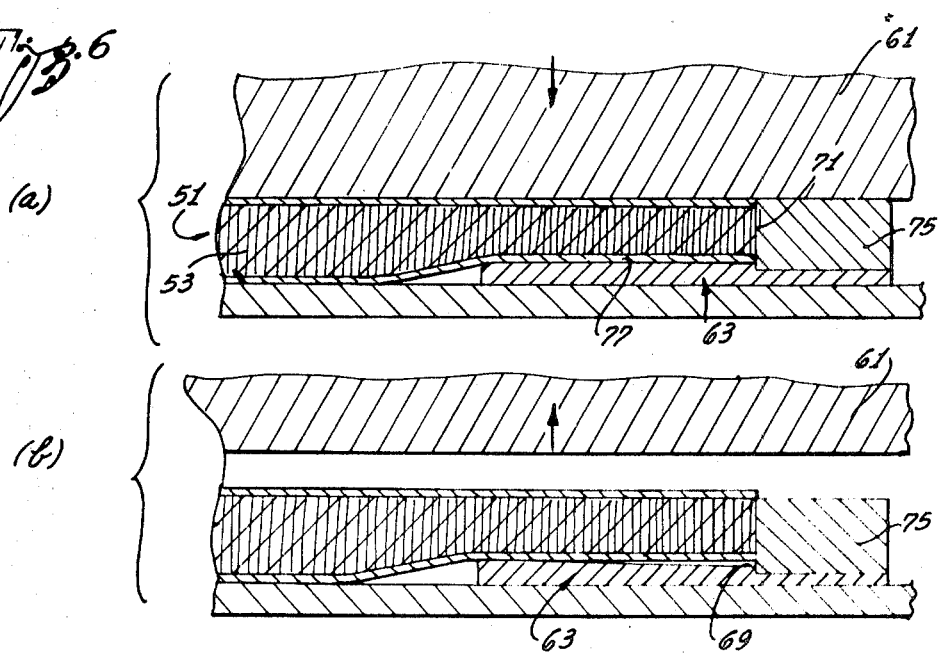
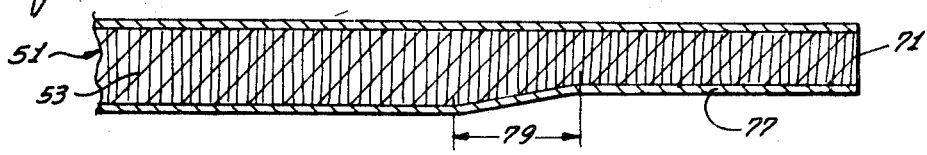
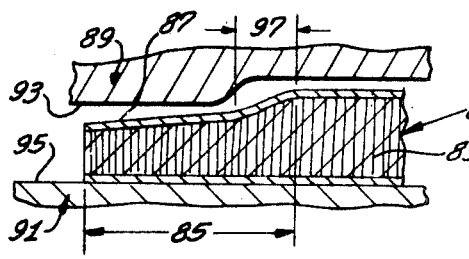

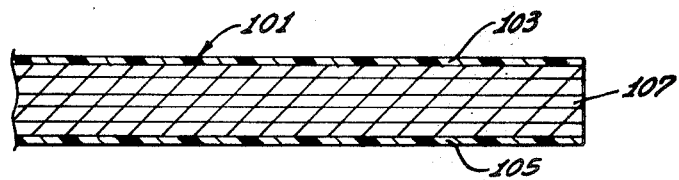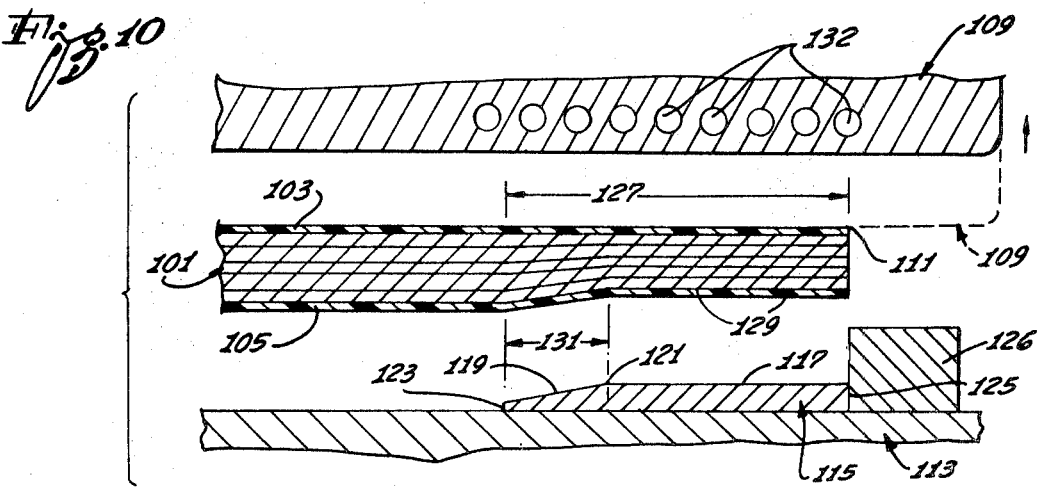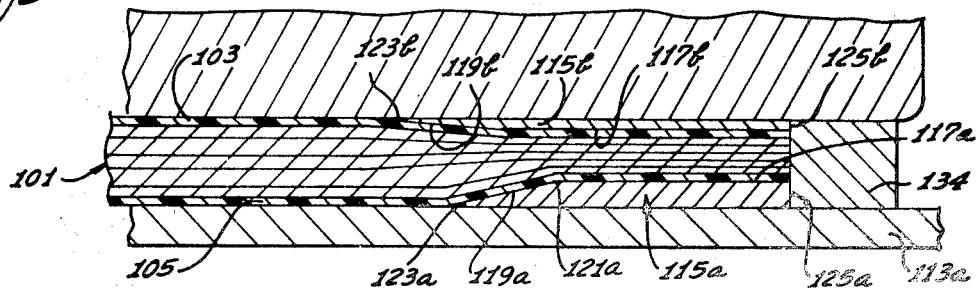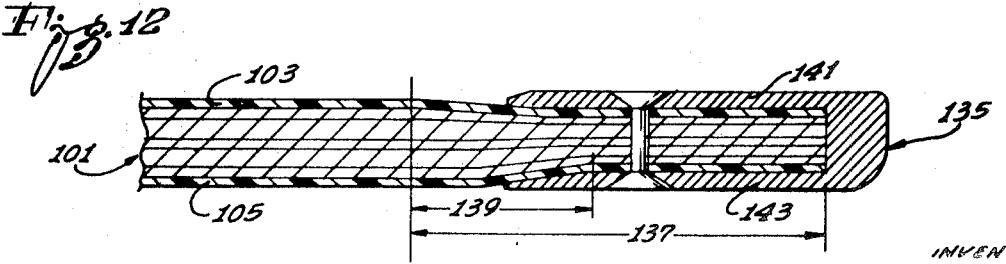

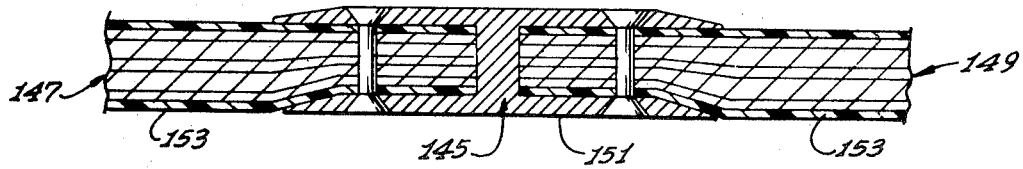
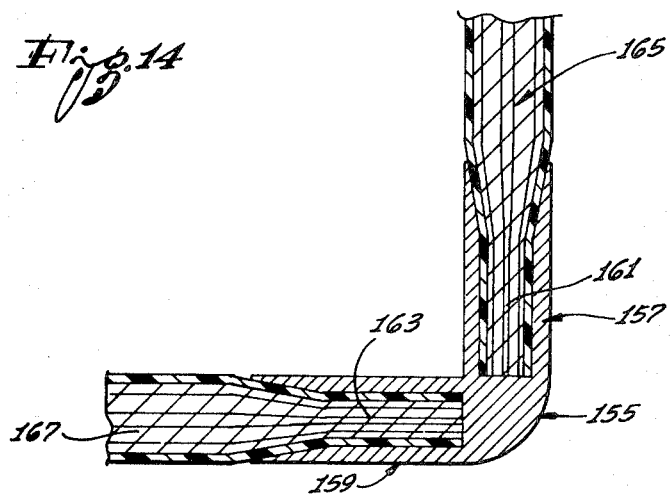
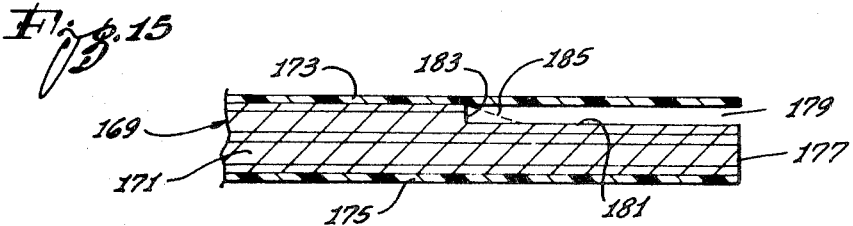
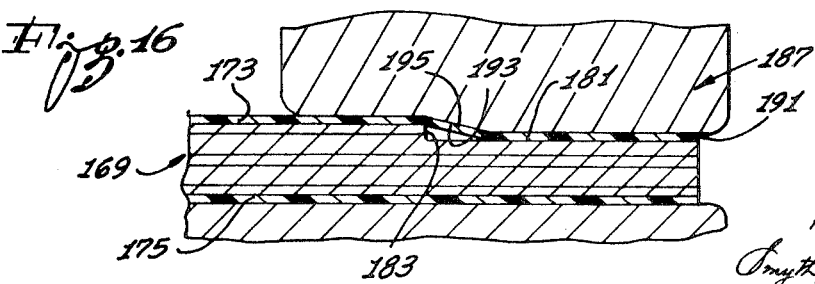

United States Patent Office 3,611,548
Patented Oct. 12, 1971

3,611,548
PANEL CONSTRUCTION AND METHOD
Peter P. Parris, Costa Mesa, Calif., assignor to
Tridair Industries, Redondo Beach, Calif.
Original application Apr. 12, 1967, Ser. No. 632,714.
Divided and this application June 18, 1969, Ser.
No. 844,711
Int. Cl. B23p 19/00
U.S. Cl. 29—428
16 Claims

ABSTRACT OF THE DISCLOSURE

The method as disclosed herein includes applying a compressive force to the faces of a sandwich panel in excess of the crushing proportional limit of the sandwich panel and below the force at which the panel structurally fails and substantially weakens to permanently reduce the thickness and increase the density of the core of the sandwich panel. The compressive force is applied along a preselected zone such as a marginal portion of the sandwich panel to reduce the thickness thereof while allowing the thickness of the main portion of the panel to remain substantially unchanged. The portion of reduced thickness is integrally joined to the remainder of the panel by a tapered transition portion. A suitable accessory member such as an edge member or a joining member is then secured to the marginal portion to increase the strength of and protect the marginal portion. The panels may be used for various purposes such as pallets.

This application is a division of application Ser. No. 632,714, filed Apr. 21, 1967, now abandoned.

BACKGROUND OF THE INVENTION

Pallets such as the type used to transport cargo in aircraft are often constructed from one or more panel members. If more than one panel member is used, the adjacent panel members are interconnected along their adjacent edges by a joining member. Pallets are handled very roughly and not infrequently the cargo handling equipment is faulty and causes substantial impact on the pallet. Accordingly, it is common practice to secure an edge member to the pallet around the periphery thereof to protect the pallet edge and increase the strength of the pallet.

The joining members are typically H- or double-channel shaped in cross-section with each of the channel portions embracing an edge portion of a panel member. Similarly the edge members are channel-shaped in cross-section and embrace the outer edge portion of the pallet.

The panel members are typically of sandwich construction and include a core with face sheets adhered to the opposed faces of the core. It is necessary or desirable to make edge members and joining members flush with at least one face of the panel members secured thereto. This is necessary to allow the pallet to be moved over a set of pallet-supporting rollers such as are used in aircraft floor structure without interference from the edge members of the joining members. To provide this flush mounting feature, it is necessary to form a recess along marginal portions of the panel members. With prior art procedures, this recess is formed by routing an edge portion of each of the panel members. The routing operation removes an edge portion of one or both of the face sheets of the sandwich panel and some of the core adjacent to such face sheet or sheets. This loss of material results in substantial reduction in strength of the pallet. As pallets are subjected to very rough use, this reduced strength is very significant in reducing the useful life of the pallet.

Pallet strength is furthter reduced in that the routing produces a notch in the panel member. The notch produces stress concentrations when the pallet is in use thereby increasing the possibility of structural failure of the pallet.

With prior art procedures, after the routing operation, an edge member is attached to the core with the ends of the edge member abutting the notch formed in the core. During use, the face sheet and core adjacent the notch tend to delaminate or break away from the ends of the edge member. This further weakens the structure and exposes the wood of the core to thereby permit the core to absorb moisture. The factors further reduce the useful life of the pallet.

SUMARY OF THE INVENTION

With the present invention the thickness of the edge portion of the panel member is reduced without substantially effecting the strength thereof. Thus, the strength of the relatively thin edge portion is approximately equal to the strength of the remainder of the pallet. The strength of the pallet constructed in accordance with the teachings of the present invention is further improved by eliminating notching of the panel and using a tapered transition section intermediate the thick and thin portions of the panel. With the present invention, it is not necessary to remove a portion of one of the face sheets to reduce the thickness of a portion of the panel member. Accordingly, the edge member or other accessory members can be attached to the panel member with the accessory member embracing edge portions of the face sheets. By not removing the face sheet, pallet strength is further increased, and the problems of delamination and moisture absorption discussed hereinabove are substantially eliminated.

The present invention is applicable to panel construction and particularly to sandwich panel used in pallet construction. A sandwich panel includes a core having generally opposed faces and first and second face sheets bonded or otherwise secured to the opposed faces of the core, respectively. The present invention is applicable to various materials; however, it is particularly applicable to cores constructed of wood such as plywood or balsa wood and to face sheets constructed of metal such as sheet aluminum or a hard plastic material such as phenolic.

A basic concept of the present invention is to reduce the thickness of a sandwich panel in a preselected zone by applying a compressive force to the panel in excess of the crushing proportional limit of the sandwich panel and below the force at which the panel structurally fails and substantially weakens to thereby facilitate installation of an accessory member on the thinned preselected zone. This results in permanently reducing the thickness and increasing the density of the core and of the sandwich panel. By following this procedure, the force required to cause failure of such a compressed panel as measured by a simple beam test is approximately equal to the force required to cause structural failure of the same panel if the thickness thereof had not been reduced by compression of the panel as taught herein. Therefore, a sandwich panel compressed in accordance with the teachings of this invention will withstand a higher stress without structural failure than will a corresponding uncompressed panel of identical materials having a thickness equal to the original thickness of the compressed panel.

In pallet construction and some other types of construction the compressed preselected zone is a marginal portion of the sandwich panel and the edge member or joining member (referred to generically herein as accessory members) have a U-shaped portion embracing the compressed marginal portion. The edge portions of the face sheets are also received within the accessory member to increase panel strength and to prevent surface delamination. The amount of compression preferably is sufficient to allow the accessory member to be mounted substantially flush with the adjacent panel surface. Of course, the present invention is not limited to pallet construction as it is useful generally in providing an area of reduced thickness in a panel for receiving various forms of accessory members. Similarly, the compressed zone need not be a marginal region of the panel.

The core can be compressed prior to adhering the face sheets thereto in which event, the force applied must exceed the crushing proportional limit of the core alone. This latter method has the advantage of requiring less force to compress the panel as the crushing proportional limit of the core alone is obviously less than the crushing proportional limit of the entire sandwich panel. It is preferred, however, to perform the crushing operation on the complete sandwich panel after the face sheets have been adhered to the core. In this instance, the force applied must exceed the crushing proportional limit of the sandwich panel in order that the panel will be permanently deformed to a thickness less than the original thickness of the sandwich panel.

The maximum force applied to the sandwich panel should not exceed the force at which the panel will structurally fail and become substantially weakened. For example, when the core is constructed of balsa wood, the maximum compressive force occurs when the core fails in shear. Similarly, it is believed that other materials if compressed sufficiently will ultimately structurally fail and substantially weaken. For certain materials, however, this may be a theoretical limit as it may be possible to compress very substantially without regard to this upper limit on the compressive force.

The present invention also teaches that it is necessary to initially compress the panel an amount greater than that desired due to inherent quality of the material known as springback, i.e. the tendency of the compressed material to increase in thickness once the compressive force has been removed. The amount of initial thickness reduction must be up to 50% greater than the desired amount of reduction in order to compensate for springback. The amount of springback depends primarily upon core density and moisture content, the thickness and tensile strength of the face sheets, and the magnitude of the compressive force.

To avoid fracture of the materials of the sandwich panel, the compressive force should be relatively slowly applied in a squeezing action as distinguished from an impact blow. Depending upon the properties of the materials utilized in the sandwich panel, it may be necessary or desirable to squeeze the panels for five to ten seconds during which time the compressive force is gradually increased up to a maximum value and then maintained at the maximum value for a second or two. The compressive force is preferably increased in increments.

The sandwich panel is squeezed between coacting die members or forming tools. To obtain optimum results, it is important that the forming tools be shaped in a particular manner. First when the core is constucted of soft material such as balsa wood the present invention teaches that the forming tool have a protruding surface which is inclined relative to the desired final plane of the reduced thickness portion. For example, if the panel is horizontal and if it is desired to indent the marginal upper surface of the panel to obtain a horizontal indented surface, it is necessary that the forming tool have a working face which is inclined upwardly as it extends outwardly toward the edge of the panel. This is necessary because the amount of springback is less along the edge of the panel than inwardly of such edge.

Secondly, if the face sheets are constructed of relatively brittle material, such as phenolic, it is important that the forming tools have a tapered edge portion to form a tapered transition section between the portion of reduced thickness and the portion of maximum thickness. This is important to avoid fracturing of the relatively brittle material of the face sheets.

Third, when the face sheets are constructed of a nonbrittle material such as aluminum, the inner edge of the protruding surface of the forming tool should be rounded, for a sharp corner would cause structural failure of the face sheet.

In some instances it is desirable to indent both faces of the panel and to indent the upper face only slightly such as to a depth of $\frac{1}{16}$ inch. It is difficult to construct an elongated, thin forming tool such as is necessary to compress a long pallet only $\frac{1}{16}$ inch. Accordingly, the present invention teaches constructing the upper forming tool of a more easily constructed thickness such as $\frac{1}{4}$ inch and utilizing a press stop and differential bearing surface areas on the forming tools to achieve the desired degree of indentation. By providing the upper forming tool with a larger bearing area than the lower forming tool, complete formation of the lower indentation prior to the upper indentation is assured. The press stop stops the press when the upper indention is at the desired depth and before the full height of the forming tool has been used to form the upper indentation.

Another feature of the present invention is to reduce the crushing proportional limit of the sandwich panel prior to applying the compressive force thereto. This permits the crushing operation to be carried out utilizing a lower compressive force. This can be accomplished, for example, by heating of the areas of the panel which are to be compressed. Preferably, such heating occurs in the press which also performs the compressing operation.

The present invention also teaches elimination of the notch or square shoulder existing heretofore between the portion of reduced thickness and the remainder of the sandwich panel. With the present invention, a tapered transition portion joins the portion of reduced thickness to the remainder of the panel. Preferably, the tapered transition portion increases in thickness as it extends toward the remainder of the panel. The tapered transition portion contains no notches which would result in stress concentration.

Such a tapered transition portion can be formed by utilizing the appropriate die members or forming tools in compressing operation. Alternatively, the tapered transition section may be formed by a method which does not involve compression of the panel. Such method includes removing a portion of the core as by machining without removing the adjacent face sheet to form a recess bounded by a surface of the core and the face sheet. An adhesive is then applied to such surface of the core and the face sheet is depressed therein.

To achieve maximum strength with this practice of the invention the core should be machined to form a tapered transition portion. However, for applications where the loads encountered are relatively light, the core can be quickly machined to form a recess which terminates in a notch. The notch is, of course, subject to stress concentration; however, this method nevertheless constitutes an improvement over prior art methods in that the machining does not remove the adjacent face sheet as does the prior art routing method.

The invention, both as to its organization and method of operation together with further features and advantages thereof may be best understood by reference to the following description taken in connection with the accompanying drawings.

BRIEF DESCRIPTION OF THE DRAWINGS

FIG. 1 is a top plan view of a typical pallet constructed from a sandwich panel of the present invention.

FIG. 2 is a fragmentary sectional view taken along line 2—2 of FIG. 1 and showing one form of edge construction of the sandwich panel.

FIG. 3 is a sectional view similar to FIG. 2 showing a second form of edge construction of the sandwich panel.

FIG. 4 is a fragmentary sectional view illustrating how two of the sandwich panels can be joined together in end-to-end relationship.

FIG. 5 is a longitudinal sectional view showing the dies for compressing a sandwich panel having relatively pliable face sheets and a soft core.

FIGS. 6(a) and (b) are views similar to FIG. 5 showing the dies advanced to compress the panel, and retracted to allow springback, respectively.

FIG. 7 is a view similar to FIG. 5 illustrating the effect of springback, when dies such as those shown in FIG. 6(b) are used.

FIG. 8 is a fragmentary sectional view through a second set of dies which may be used when it is desired to provide a portion of reduced thickness having a tapered outer face.

FIG. 9 is a fragmentary sectional view of a typical sandwich panel having relatively brittle face sheets and a relatively hard core prior to compression thereof.

FIG. 10 is a fragmentary sectional view showing the forming tools for compressing the panel of FIG. 9.

FIG. 11 is a fragmentary sectional view showing a second set of forming tools for indenting both faces of the panel of FIG. 9 a different amount.

FIG. 12 is a fragmentary sectional view showing an edge member secured to a panel having both faces thereof indented a different amount.

FIG. 13 is a fragmentary sectional view showing an alternate form of joining member.

FIG. 14 is a fragmentary sectional view showing a joining member for securing adjacent panels together at an angle relative to each other.

FIG. 15 is a fragmentary sectional view through a sandwich panel and illustrating a first step of an alternate method of reducing the thickness of an edge portion of the panel.

FIG. 16 is a fragmentary sectional view illustrating the final step in the alternate method.

DESCRIPTION OF THE SPECIFIC EMBODIMENT

Referring to the drawings and in particular to FIG. 1 thereof, reference numeral 11 designates a cargo pallet constructed in accordance with the teachings of this invention. Generally the pallet 11 includes a broad generally rectangular center section 13 having an edge member 15 secured thereto along a peripheral region or marginal portion of the center section. The center section 13 is preferably of sandwich construction and includes one or more sandwich panels 16. The edge member 15 is preferably a metal member which is provided to peripherally reinforce the pallet 11 and, in case of a cargo pallet to provide tie down fittings 16a for retaining the cargo net or other containerizing means for the load carried by the cargo pallet. Seat pallets, which have passenger seats mounted thereon are similar in plan to the pallet 11 except that the fittings 16a are not used on seat pallets.

The primary reason that pallets must be strongly constructed is that pallets are subjected to very rough handling. Not infrequently, the pallet handling equipment is faulty and causes substantial impact on the pallet. In addition, dynamic loads are applied to the edge portion of the pallet through the edge member 15. These dynamic loads are applied by the cargo carried by the pallet acting through the various straps or nets which retain the cargo and which are secured to the edge member 15.

FIG. 2 illustrates typical edge construction for a seat pallet. In FIG. 2, the panel 16 includes a soft core 17 preferably constructed of end grain balsa wood having generally opposed and generally parallel faces 19 and 21. The sandwich panel 16 also includes face sheets 23 and 25 of a pliable material such as sheet aluminum which are adhered as by bonding to the faces 19 and 21, respectively. The sandwich panel 16 may be of various lengths and widths and preferably the face sheets 23 and 25 are coextensive with the faces 19 and 21, respectively.

The sandwich panel 16 has a marginal or peripheral portion 27 of reduced thickness and increased density. The marginal portion 27 includes and is interconnected to a central section 29 of the sandwich panel 16 by a tapered transition portion 31. The thickness of the marginal portion 27 is reduced by indenting both of the sides or faces of the sandwich panel an equal amount as illustrated in FIG. 2.

The edge member 15 is generally channel-shaped in cross-section and has a pair of legs 33 and 35 interconnected by a web 37. The edge member 15 is suitably secured as by an adhesive or a rivet to the marginal portion 27 with the legs 33 and 35 engaging the face sheets 23 and 25, respectively, and with the web 37 engaging an edge 39 of the sandwich panel 16. With the edge member 15 so arranged, the outer faces of the legs 33 and 35 are substantially flush with the outer surfaces of the face sheets 23 and 25 to allow the pallet to be freely rolled along a suitable supporting track without interference from the edge member 15 and to present a smooth upper pallet face. Tapered end portions 41 compensate for the varying thickness through transition portion 31.

The marginal portion 27 which originally had the thickness of the central section 29 will withstand a force in a simple beam test which is approximately equal to the force that can be withstood without structural failure by the central section 29. Stated differently, a greater stress is required to structurally fail the marginal portion 27 than to structurally fail the central section 29. Further, the tapered transition portion 31 prevents undue stress concentration at the juncture of the marginal portion 27 and the central section 29.

Various materials may be utilized for the core 17. Balsa is a good core material because of its high strength-to-weight ratio. When balsa is utilized, the grain of the wood should extend generally perpendicular to the face sheets 23 and 25 in order to obtain the maximum compressive strength of the balsa wood.

FIG. 3 shows a sandwich panel 16a and an edge member 15a of the type typically utilized in the construction of cargo pallets. The structure of FIG. 3 is quite similar to the structure of FIG. 2, and accordingly, corresponding parts in FIG. 3 are designated by corresponding reference numerals followed by the letter a. The sandwich panel 16a includes a core 17a of end grain balsa having face sheets 23a and 25a adhered thereto. The sandwich panel 16a has a tapered transition section 31a interconnecting a section of reduced thickness 27a with a central section 29a. The marginal portion 27a of reduced thickness differs from the marginal portion 27 in that only the lower face thereof is indented whereas the upper face thereof is substantially coplanar with the upper face of the central portion in 29. Thus, the tapered transition portion 31a tapers only along the lower surface thereof.

The edge member 15a has a pair of legs 33a and 35a interconnected by a web 37a. The web 37a is thicker and stronger than the web 37 and the legs 33a and 35a are longer than the legs 33 and 35. Furthermore, the leg 33a projects above the outer surface of the face sheet 23a of the central section 29 while the leg 35a is flush with the outer surface of the face 25a of the central section 29a. The edge member 15a has tapered end portions 41a. The edge member 15a may be secured along the marginal portion 27a by a plurality of rivets 43 (only one being shown in FIG. 3).

For various structures such as pallets, it may be necessary or desirable to secure a pair of sandwich panels together in end-to-end relationship. This can be accomplished by a joining member 45 of generally H-shaped or double-channel shaped cross-section as shown in FIG. 4. The joining member 45 joins two sandwich panels 47 and 49 in end-to-end relationship. The sandwich panels 47 and 49 are identical to the panel 16, however, panels, of other configurations may be utilized. The joining member 45 preferably extends continuously along the confronting edges of the panels 45 and 47 and snugly embraces the marginal portions of reduced thicknesses thereof. In the embodiment illustrated in FIG. 4 the outer surface of the joining member 45 is flush with the outer surfaces of the exposed portions of the panels 47 and 49 to provide smooth substantially continuous upper and lower surfaces. The edge members 15 and 15a and the joining member 45 and various other similar members are referred to generically herein as accesory members.

Generally, in the construction of the pallet 11, one or more sandwich panels are provided with marginal portions of reduced thickness. If more than one panel is used, several of these panels are interconnected, for example, as shown in FIG. 4. Next the edge members are attached and various pallet accessories are added.

FIG. 5 illustrates how a sandwich panel 51 having a core 53 of relatively soft material such as end grain balsa wood and face sheets 55 and 57 of a pliable material such as aluminum can be compressed. A marginal portion 59 is squeezed in a press between an upper die member or forming tool 61 and a lower die member or forming tool 63. The forming tool 61 has a planar working face 65 and the forming tool 63 includes a projection 67 having a generally planar working face 69 which is inclined downwardly relative to the horizontal as it extends outwardly toward an edge 71 of the panel 51. Thus, the working face 69 is not parallel to the working face 65 but is inclined away from the working face 65 as they extend outwardly toward the edge 71.

An inner corner 73 of the lower forming tool 63 is formed with a small radius. A sharp corner would tend to cut or fracture the aluminum face sheet 55. The forming tools 61 and 63 extend longitudinally along the marginal portion 59 for the length of the marginal portion that it is desired to compress. A press stop 75 is provided to limit the downward stroke of the upper forming tool 61.

By moving the upper forming member to the position shown in FIG. 6, the marginal portion 59 of the sandwich panel 47 is compressed as shown to form an indented face 77 along the underside of the panel 51. With the forming tools in the position shown in FIG. 6a the indented face 77 is inclined to conform to the working face 69.

When the upper forming tool 61 is retracted, the marginal portion 59 springs back to assume the positions shown in FIGS. 6(b) and 7 at which the idented face 77 is substantially parallel to the upper face of the sandwich panel. When the core 53 is constructed of soft material such as balsa wood, use of the forming tools 61 and 63 inherently produces a tapered transition section 79 which progressively increases in thickness as it extends away from the edge 71 to form a lateral extension of the marginal portion of reduced thickness.

More particularly, the method as illustrated in FIGS. 5–7 is carried out by slowly advancing the forming tool 61 to gradually increase the compressive force applied to the marginal portion 59. As indicated hereinabove, the compressive force must exceed the crushing proportional limit of the sandwich 51. As the core is softer than the face sheets, all of the thickness reduction occurs in the core.

Because of spring back, it is necessary to initially compress the panel 51 more than desired. Also, when using a soft core, such as balsa wood, it is necessary to compress the inner regions of the marginal portion 59 a greater amount than the regions of the marginal portion adjacent the edge 71 if it is desired to form the indented face 77 in generally parallel relationship to the upper face of the sandwich 51.

By way of example, the panel 51 may include a half inch thick balsa wood core with 7075–T6 aluminum face sheets of .063 inch thickness. The lower forming tool 63 may have a maximum height of .180 inch and taper to a minimum height of .150 inch and have a .06 inch radius along the inner corner 73. The width of the forming tool 63 is 2 inches. Thus, the marginal portion 59 would initially be compressed along a 2 inch wide strip from an original thickness of about .626 inch to about from .466 inch to about .496 inch. When the compressive force is removed from the marginal portion 59, the spring back of the sandwich 51 would cause the thickness of the marginal portion 59 to increase to about .500 to .529 inch thickness and would further cause the indented face 77 to be generally parallel to the upper face of the panel 51. The angle of taper of the tapered transition section 79 is 7° from the horizontal.

It will be apparent that the indented face 77 may be formed on either the upper or lower face of the sandwich 51 and that the core 53 could be compressed before the face sheets 55 and 57 are adhered thereto. Furthermore, by utilizing a pair of forming tools 63, both the upper and lower faces of the panel 51 could be indented to produce one of the panels 16 (FIG. 2).

FIG. 8 shows a sandwich panel 81 having an end grain balsa wood core 83 in which a marginal portion 85 of the panel 81 has been indented along the upper face thereof to form a tapered indented face 87. The marginal portion 85 is slowly squeezed between forming tools 89 and 91 having generally palanar parallel working surfaces 93 and 95, respectively.

The embodiment shown in FIG. 8 is identical to the embodiment shown in FIGS. 5–7 except that with the former die members with parallel working surfaces 93 and 95 are used and the indentation is formed along the upper face of the sandwish panel 81. Although the working surfaces 93 and 95 are operative to initially compress the area contacted thereby an equal amount, the inner region provides more of the springback effect to thereby produce the inclined indented face 87. As with the previous embodiment, a tapered transition portion 97 is inherently formed. It is apparent that by varying the angular relationship between the working surfaces 93 and 95 that the indented face 87 may be caused to assume many different angular orientations.

The embodiments shown in FIGS. 9–12 utilize a sandwich panel 101 having face sheets 103 and 105 of a relatively brittle material such as phenolic adhered to a relatively hard core 107. The core 107 may be constructed, for example, of plywood.

FIG. 10 shows the preferred tooling for indenting one face of the sandwich panel 101. Such tooling includes an upper forming member or die 109 having a generally planar working surface 111, a base member 113 the upper face of which is generally parallel to the working surface 111, and a lower forming tool or die member 115 resting on the base member 113. The lower forming tool projects above the upper surface of the base member 113 and has a planar working surface portion 117 generally parallel to the working face 111 and an inclined working face portion 119 extending along an inner edge portion thereof. The working surface portion 117 and 119 are joined by a radius 121 and the inner edge of the surface portion 119 is spaced from the upper surface of the base member 113 by an inner edge 123. The working surface 117 is spaced from the upper surface of the base member 113 by an outer edge 125. A press stop 126 may be provided.

The sandwich panel 101 is placed in the press with a marginal portion 127 engageable with the working surfaces 111, 117 and 119. The upper forming tool 109 is advanced toward the lower forming tool 115 to slowly squeeze and compress the marginal portion 127. The force applied by the forming tools 109 and 115 is gradually increased until it exceeds the crushing proportional limit of the sandwich 101 and until the working surface portion 117 has forced the lower face sheet 105 inwardly an amount equal to the height of the forming tool 115. This squeezing operation may take up to five to ten seconds. Subsequently, the upper forming tool 109 is withdrawn to allow the panel 101 to spring back to increase the thickness of the marginal portion 127 to a thickness somewhat less than the original thickness thereof. As shown in FIG. 10, only the lower face 105 is indented to form an indented surface portion 129. The inclined working surface portion 119 forms a tapered transition section 131. If a radius such as the radius 73 or a sharp corner were used in lieu of the working surface portion 119, the relatively brittle face sheet 105 would structurally fail during the compressing operation. The radius 73 is usable when the face sheets are relatively pliable as when aluminum face sheets are used.

By way of example, the sandwich panel 101 may have a plywood core of ½ inch thickness and each of the face sheets 103 and 105 may be formed from phenolic of $\frac{1}{16}$ inch thickness. The working surface portion 119 may be $\frac{3}{16}$ inch above the upper surface of the base member 113 and 2¼ inch wide. The edge 123 may have a height of .040 inch above the upper surface of the base member 113. Thus, the working surface portion 119 tapers from a maximum height of $\frac{3}{16}$ inch to a minimum height of .040 inch and is ¾ inch wide. The forming tools 109 and 115 are operated to originally compress the marginal portion 127 to a maximum depth of $\frac{3}{16}$ inch, i.e. the full height of the lower forming tool 115. Under these conditions, it has been found that the amount of springback will equal approximately $\frac{1}{16}$ inch so that the indented surface portion 129 is indented about ⅛ inch. The resulting compressed panel may be utilized, for example, as shown in FIG. 3.

The present invention also provides for heating of the sandwich panel 101 prior to applying the compressive forces thereto. The panel 101 is preferably heated when it is in the press. This can be accomplished by providing steam and/or hot water passages or electric heating coils 132 (FIG. 10) through various portions of the press such as the tool 109 which are in heat-transfer relationship to the panel 101. It has been found that by using water or steam to heat the portions of the press to a temperature to about 215° Fahrenheit and maintaining the heated portion of the press in contact with the panel 101 for about seven minutes will reduce the compressive force required by about 50%. Heating is used primarily with panels requiring compression of more than ⅛ inch and/or having brittle face sheets over $\frac{1}{16}$ inch thick.

FIG. 11 shows how both of the faces 103 and 105 of the panel 101 can be indented. FIG. 11 illustrates a base member 113a and a lower forming tool 115a. The lower forming tool 115a is identical to the lower forming tool 115 shown in FIG. 10 and corresponding portions of the forming tool 115a are designated corresponding reference characters with the letter a added.

FIG. 11 also shows an upper forming tool 115b which is mounted for movement toward and away from the panel 101. The upper forming tool 115b is shaped similarly to the forming tool 115 and corresponding surfaces of the upper forming tool 115b are designated by corresponding reference characters with the letter b added to it.

The forming tool 115b and 115a differ from each other in that the former has no radius joining the working surface portions 117b and 119b and the dimensions of the two forming tools are different. Thus, the surfaces 117a and 117b are parallel to each other with the surface 117b having a greater width as shown in FIG. 11. Similarly, the outer edge 125b is of less height than the corresponding outer edge 125a and the surface 119b is at less of an angle with respect to the horizontal than is the corresponding surfaces 119a.

The forming tool 115b has a greater area in contact with the panel 101 than does the forming tool 115a. Thus, there is a greater force per square inch acting on the lower side of the panel 101 along the surfaces 117a and 119a than there is along the surfaces 117b and 119b of the upper forming tool 115b. This assures that the indentation along the lower face 105 will be fully and completely formed before the upper indentation is formed. This permits use of a forming tool 115b which is substantially thicker than the depth of the shallow indentation formed thereby. In this event, the press stop 134 stops downward movement of the tool 115b to prevent excessive indenting of the upper surface of the panel 101. Although the indentation along the face sheet 103 in FIG. 11 is of lesser depth than the indentation formed along the face 105, it should be understood that these indentations may be of equal depth or the upper indentation may be of greater depth than the lower indentation, if desired.

FIG. 12 shows how the sandwich 101 after having been compressed as shown in FIG. 11 can be utilized in combination with an edge member 135. As thus formed, the sandwich panel 101 has a compressed marginal portion 137 and a tapered transition portion 139 that tapers outwardly along both faces thereof as it extends toward the uncompressed region of the sandwich panel 101. The edge member 135 has an upper leg 141 which projects above the face sheet 103 at the uncompressed portion of the panel and a lower leg 143 which is substantially flush with the adjacent section of the face sheet 105.

FIG. 13 shows a joining member 145 of H- or double-channel shaped cross-section utilized as a connector to interconnect two sandwich panels 147 and 149 constructed as shown in FIG. 10. The lower surface 151 of the joining member 145 is flush with the lower surface 153 of the exposed portions of the panels 147 and 149. The joining member 145 may be utilized to interconnect the adjacent panels 147 and 149 to form a portion of a pallet or for use in other structures.

FIG. 14 shows a joining member 155 having two socket portions 157 and 159 interconnected to form a right angle. Of course, the size of the angle between the socket portions 157 and 159 can be varied as desired. The socket portions 157 and 159 receive, respectively, marginal portions 161 and 163 of a pair of sandwich panels 165 and 167. Each of the panels 165 and 167 are indented equal amounts from both faces thereof along the marginal portion thereof so that the adjoining surfaces between the joining member 155 and the panels 165 and 167 are flush as shown.

FIGS. 15 and 16 illustrate an embodiment of the present invention in which the sandwich panel is not compressed. FIG. 15 illustrates a sandwich panel 169 having a core 171 and face sheets 173 and 175 adhered to the core and an outer edge 17. An edge portion of the core 171 contiguous the face sheet 173 has been machined to remove that edge portion without removing the face sheet 173 to form an elongated void or channel 179 in the panel 169. The channel 179 is bounded by a surface 181 of the core 171 and by the face sheet 173. The core 171 may be machined to form a generally right angle notch 183 or to form an inclined surface 185 as shown in phantom in FIG. 13.

Next, an adhesive such as an epoxy is applied to the surface 181 and if desired along the notch 183 or the inclined surface 185. Then, the panel 169 is placed between die members 187 and 189 and these die members are urged together with sufficient force to cause a portion 191 of the face sheet 173 to engage with and be secured by the adhesive on the surface 181. The die member 187 has an irregular shaped working surface 193 to allow the formation of an inclined section 195 of the portion 191 of the face sheet 173. This prevents any substantial stretching or thinning of the face sheet such as would occur if the face sheet were forced into the notch 183. In the event that the notch 183 is used in lieu of the taper 185, the space beneath the inclined section 195 may be filled with adhesive, if desired.

Although the above described embodiment does operate to weaken the panel 169, the face sheets 173 and 175 are not removed, and therefore, the face sheets are available to add strength to the marginal portion of the panel 169. Furthermore, as the face sheets 173 and 175 are not removed, any accessory member, such as the accessory members shown in FIGS. 2–4 provided thereover will overlap the face sheets and therefore tend to prevent delamination or moisture absorption by the core 171.

If desired, the core 171 could be machined before the face sheets 173 and 175 were adhered thereto. The above described method is particularly useful where some weakening of the marginal portion of the sandwich panel is permissible.

Although exemplary embodiments of the invention have been shown and described, many changes, modifications, and substitutions may be made by one having ordinary skill in the art without necessarily departing from the spirit and scope of this invention.

I claim:

1. A method of making a pallet comprising:
   providing a substantially solid and continuous compressible panel having generally opposed faces;
   applying a compressive force to the faces of a marginal portion of the panel positioned between coacting die members to permanently reduce the thickness of the marginal portion, said marginal portion extending for a substantial distance around said panel;
   removing said compressive force to allow the marginal portion of the panel to spring back to a thickness which is less than the original thickness of the marginal portion of the panel;
   providing an accessory member of generally U-shaped cross section; and
   attaching the accessory member to the panel with fastener members with the U-shaped cross section of the accessory member embracing the marginal portion of the panel and extending for a substantial distance around said panel, said step of attaching being carried out subsequent to said step of applying.

2. A method of making a pallet comprising:
   providing a sandwich panel including a core of balsa wood and pair of face sheets secured to the opposed faces of the core and defining opposed faces of the sandwich panel;
   squeezing a marginal portion of the sandwich panel between coacting die members to apply a compressive force to the core which is sufficient to permanently reduce the thickness and increase the density of the marginal portion of the core and the sandwich panel without causing substantial weakening and structural failure of the sandwich panel;
   discontinuing said step of squeezing to an extent sufficient to allow the marginal portion of the sandwich panel to spring back due to its inherent resiliency to a thickness which is less than the original thickness of the marginal portion of the sandwich panel;
   providing an elongated edge member having a pair of flanges interconnected by a web, said flanges and said web defining a generally U-shaped cross section for said edge member;
   positioning the edge member so that the edge member receives the marginal portion of the sandwich panel; and
   attaching the edge member to the sandwich panel using fastener members.

3. A method of making a sandwich construction comprising:
   providing a sandwich panel including a compressible core having generally opposed faces and a pair of face sheets secured to the opposed faces of the core and defining opposed faces of the sandwich panel;
   providing first and second coacting die members having first and second working faces engageable, respectively, with the opposed faces of the sandwich panel, said first die member being thicker than said second die member and the area of the working face of said first die member being less than the area of the working face of the second die member;
   relatively advancing said die members into engagement with a marginal portion of said sandwich panel;
   squeezing the marginal portion of said panel between said die members to permanently indent both faces of said panel with the indentation formed by the first die member being deeper than the indentation formed by the second die member;
   discontinuing said step of squeezing to an extent sufficient to allow the marginal portion of the sandwich panel to spring back due to its inherent resiliency to a thickness which is less than the original thickness of the marginal portion of the sandwich panel; and
   attaching an accessory member to the marginal portion of the sandwich panel with the accessory member extending along said marginal portion and at least partially embracing the same.

4. A method as defined in claim 1 wherein one of said die members defines a protruding working surface for engaging one of said faces of the panel along said marginal portion, said working surface having a radius along the edge thereof remote from the edge of the panel to prevent shearing of the face contacted thereby.

5. A method was defined in claim 1 wherein one of said die members defines a protruding working face engagable with one of said faces of the panel along said marginal portion with the protruding working face being inclined away from said one face as it extends toward the edge of said panel and said step of applying includes pressurally engaging said protruding working face with said one face to form an indentation in said one face along the marginal portion with the indentation having an outer face inclined to said other face of said panel as a result of said step of applying and said step of removing allows said marginal portion to spring back to a position in which the outer face of the indentation is generally parallel to said other face of the panel.

6. In a method of making a strong sandwich construction, the steps of:
   providing a sandwich panel including a core at least partially constructed of wood and having generally opposed faces, the panel also including a pair of face sheets secured to the opposed faces of the core and defining opposed faces of the sandwich panel;
   providing coacting die members with one of the die members defining a protruding working face with an inclined surface adjacent one edge thereof:
   squeezing a marginal portion of the sandwich panel between the coacting die members to apply a compressive force to the panel;
   increasing the compressive force to a magnitude in excess of the crushing proportional limit of the panel to reduce the thickness and increase the density of the marginal portion of the sandwich panel with said inclined surface of said one die member forming a tapered transition section joining said marginal portion to the remainder of the sandwich panel;
   discontinuing said step of squeezing to the extent necessary to allow the marginal portion of the sandwich panel to spring back due to its inherent resilliency to a thickness which is less than the original thickness of the sandwich panel; and
   attaching an accessory member having a leg portion to the sandwich panel with the leg portion lying at least partially in said marginal portion of the sandwich panel.

7. A method as defined in claim 6 wherein the other of said die members also defines a protruding working face with an inclined surface adjacent one edge thereof and said step of squeezing forms indentations on both faces of the sandwich panel.

8. A method as defined in claim 6 wherein said one die member defines a lower die member and the other die member defines an upper die member, said upper die member having a surface area engageable with the marginal portion of the sandwich panel which is larger than the surface area of the lower die member which is engageable with the marginal portion of the sandwich panel.

9. A method as defined in claim 6 including heating of the sandwich panel to substantially above ambient temperature to reduce the crushing proportional limit thereof to thereby allow the thickness of the sandwich panel to be reduced with a lesser compressive force.

10. A method as defined in claim 6 wherein the sandwich panel has a plywood core and the face sheets are constructed of phenolic.

11. A method as defined in claim 6 wherein the compressive force is increased in increments.

12. In a method of constructing a sandwich panel, the steps of:

provmding a core of predetermined thickness and having generally opposed faces and first and second portions;

reducing the thickness of the first portion of the core to a reduced thickness;

tapering a section of the first portion contiguous to the second portion of the core from a maximum thickness equal to about said predetermined thickness contiguous said second portion to a lesser thickness equal to about said reduced thickness remote from said second portion;

applying adhesive to at least one of said faces of said first portion of said core;

forcing a facing sheet against said adhesive; and attaching an accessory member to said first portion.

13. A method as defined in claim 12 wherein said step of reducing includes machining the core along a plane generally parallel to the faces of the core and said step of tapering includes machining said core along a plane inclined to the faces of the core.

14. In a method of constructing a pallet from a sandwich panel of the type including a machinable core having generally opposed faces and face sheets secured to the generally opposed faces of said core, respectively, the steps of:

removing an edge portion of the core contiguous one of the face sheets to remove said edge portion withoutmoving said one face sheet to form an elongated void in said panel bounded by a surface of the core and a section of said one face sheet;

applying adhesive to at least a portion of said surface of the core;

forcing at least a portion of said section of said one face sheet into engagement with the adhesive to secure said portion of said section of said one face sheet to said surface of the core to define a marginal portion of the sandwich panel; and attaching an accessory member having a generally U-shaped portion to the sandwich panel with the U-shaped portion embracing the marginal portion of the sandwich panel.

15. A method as defined in claim 1 wherein said edge member includes spaced flanges interconnected by a web for receiving the marginal portion of the core, said web being substantially noncompressible in a direction transverse to the plane of said panel.

16. A method as defined in claim 1 including reducing the crushing proportional limit of the core prior to said step of applying.

References Cited

UNITED STATES PATENTS

| | | | |
|---|---|---|---|
| 2,644,553 | 7/1953 | Cushman | 29—455 LM |
| 2,720,948 | 10/1955 | Pajak | 29—455 LM |
| 2,752,672 | 7/1956 | Tolman | 29—455 LM |
| 2,814,718 | 11/1957 | Hardesty | 29—455 LM |
| 2,833,003 | 5/1958 | Bourne | 29—455 LM |
| 2,887,759 | 5/1959 | Brownell | 29—428 |
| 2,961,760 | 11/1960 | Horton | 29—455 LM |
| 3,041,912 | 7/1962 | Kreider | 29—455 LM |
| 3,166,831 | 1/1965 | Keith | 29—455 LM |

JOHN F. CAMPBELL, Primary Examiner

D. P. ROONEY, Assistant Examiner

U.S. Cl. X.R.

29—428, 432.2, 455 LM; 52—223 L; 108—92